Dec. 8, 1959 C. MARTELEUR 2,916,559
MAGNETIC RECORDING AND REPRODUCING DEVICE
Filed June 1, 1956
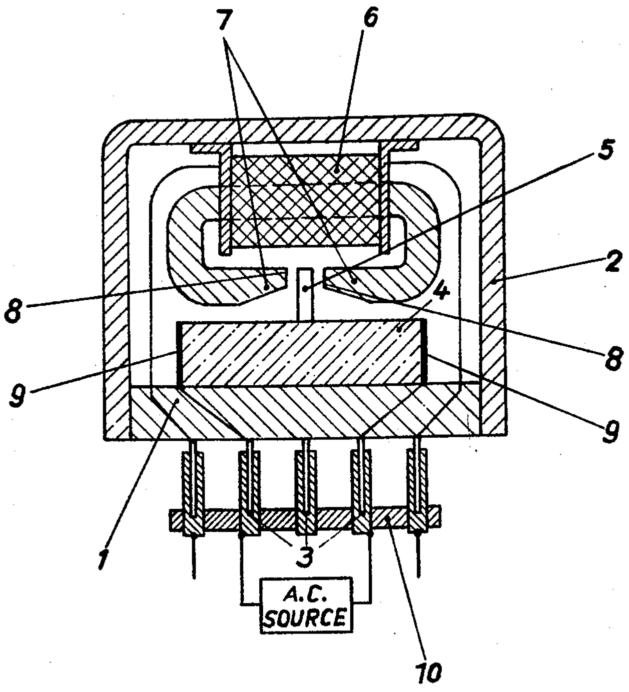
INVENTOR
C. MARTELEUR
BY Robert Harding Jr.
ATTORNEY United States Patent Office 2,916,559

Patented Dec. 8, 1959

2,916,559

MAGNETIC RECORDING AND REPRODUCING DEVICE

Carl Marteleur, Stuttgart-Zuffenhausen, Germany, assignor to International Standard Electric Corporation, New York, N.Y., a corporation of Delaware Application June 1, 1956, Serial No. 588,693

Claims priority, application Germany June 10, 1955

5 Claims. (Cl. 179—100.2)

This invention relates to magnetic devices for recording and reproducing electrical signal information, particularly on a binary or ternary basis.

In magnetic recording and reproducing devices it is at present customary to use as the magnetizable medium, wires, tapes or drums, which during both recording and reproduction are moved at a relatively high speed past the recording and reproducing heads.

In the arts of computing equipment and communication engineering it is often necessary to provide small monocell recording and reproducing elements which are required to scan recorded signal information several times. It is an object of the present invention to provide a small magnetic recording element of this type which is inexpensive to manufacture and occupies a small space.

According to one feature of my invention a device of the above-mentioned type comprises a combined recording and reproducing head consisting of an energizing coil wound upon a core having a pair of pole faces separated by an air gap, a magnetizable member being positioned in the air gap between the pole faces and in the reproducing process being moved in a plane which is parallel to such pole faces.

The above and other features of the invention will be better understood from the following description taken in conjunction with the accompanying drawing, which is a sectional view of a magnetic device according to one embodiment of the invention.

In the drawing the magnetic monocell recording and reproducing device consists of a base member 1 on which is mounted a housing 2. The lower side of the base member 1 is provided with connecting pins 3, whilst on the upper surface is mounted a piezo electric crystal 4 which carries on its upper face a magnetizable member 5. On the upper side of the housing 2 there is mounted an energizing coil 6 which is wound on the straight portion of a C-shaped core 7 having a pair of pole faces 8 separated by an air gap. The crystal 4 is provided with electrodes 9 which are respectively connected to two of the pins 3, two other of these pins being respectively connected to the ends of the coil 6. The pins 3 are adapted to plug into a socket member 10.

The magnetizable member 5 is so mounted on the crystal 4 that it projects into the air gap midway between the two pole faces 8.

In the recording process when the recording is to be made on a binary basis, the coil 6 will be energized by positive or negative impulses and the member 5 will thereby be magnetized in a corresponding direction. It will be noted that one advantage of the arrangement according to the invention resides in the fact that the magnetizable member is positioned exactly between the pole faces 8 and thereby at the point of greatest density of the magnetic flux. The electrical signal information which is stored in the magnetizable member 5 may be reproduced as often as is desired and thus utilized for performing repeated counting or controlling operations. During each reproducing cycle a source of alternating voltage is applied to the crystal 4 thereby causing it to vibrate together with the member 5. By this means the magnetized member 5 is moved in a plane parallel to the pole faces 8, thereby producing in the coil 6 an induced voltage which may be evaluated and utilized in any suitable and well known manner by means of other apparatus. This reproducing process may be repeated as often as is required. It will be appreciated that in order to differentiate between positive and negative information suitable known means will be provided for evaluating only the first half cycle. In the case of a succeeding reading of stored information it is necessary to wait until the crystal 4 or other oscillating device has returned to its normal condition so that at each successive reading the magnetizable member 5 commences to oscillate again from its normal position.

When, as above described, the signal information is recorded with the magnetizable member 5 stationary by applying to the coil 6 positive or negative impulses, the recording will be effected on a binary basis. It is, however, also possible to evaluate the absence of either positive or negative signal information, in which case there are three possible conditions of magnetization and hence the signal information may be recorded on a ternary basis.

Other means for vibrating the magnetizable member 5 may be used in place of a piezo-electric crystal, for example, mechanical vibrators or electro-dynamic coils.

While I have described above the principles of my invention in connection with specific apparatus, it is to be clearly understood that this description is made only by way of example and not as a limitation to the scope of my invention.

What is claimed is:

1. A magnetic device for recording and reproducing electrical signal information, comprising a coil wound upon a pair of pole faces separated by an air gap, a single magnetizable member positioned between said pole faces in said air gap, means for applying electrical signal impulses to said coil to first magnetize said member for the purpose of recording and storing said signals and means for then vibrating said member in a direction normal to the magnetic field produced by said pole faces and in a plane parallel to the plane of said pole faces to induce a voltage in said coil for the purpose of reproducing said stored signals.

2. A magnetic device according to claim 1 in which means is provided for vibrating said member between said pole faces whereby signal information recorded on said member may be reproduced repeatedly.

3. A magnetic device according to claim 1, wherein said magnetizable member is mounted on a piezo electric crystal, the electrodes of which are adapted to be connected to a source of alternating current.

4. A magnetic device for recording and reproducing electrical signal information, comprising a base plate, a housing, a recording and reproducing head mounted on said housing, said head comprising an energizing coil wound upon a C-shaped core having a pair of pole faces separated by an air gap, a piezo electric crystal mounted on said base plate, a single magnetizable member mounted on said base plate, a magnetizable member mounted on said crystal to project into the air gap between said pole faces, connecting pins mounted on said base plate and electrical connections extending from said coil and said crystal to respective ones of said pins.

5. A magnetic monocell for recording and reproducing electrical signal information comprising a coil wound upon a pair of pole faces separated by an air gap, a single magnetizable member positioned between said pole faces in said air gap, means for applying electrical signal impulses to said coil to first magnetize said member for the purpose of recording and storing said signals, means for then reciprocating said member in a direction normal to the magnetic field produced by said pole faces and in a plane parallel to the plane of said pole faces to induce a voltage in said coil for the purpose of reproducing said stored signals.

References Cited in the file of this patent

UNITED STATES PATENTS

| | | |
|---|---|---|
| 2,423,339 | Newman | July 1, 1947 |
| 2,509,780 | O'Dea | May 10, 1950 |
| 2,574,708 | Rettinger | Nov. 13, 1951 |
| 2,585,932 | Hare | Feb. 19, 1952 |
| 2,587,593 | Camras | Mar. 4, 1952 |
| 2,656,420 | Isberg | Oct. 20, 1953 |
| 2,658,950 | Canfora | Nov. 10, 1953 |
| 2,681,387 | Roys | June 15, 1954 |
| 2,756,276 | Gratian | July 24, 1956 |